US007668251B2

(12) United States Patent
Magee

(10) Patent No.: US 7,668,251 B2
(45) Date of Patent: Feb. 23, 2010

(54) SCALABLE POST-CHANNEL ESTIMATE PHASE CORRECTOR, METHOD OF CORRECTION AND MIMO COMMUNICATION SYSTEM EMPLOYING THE CORRECTOR AND METHOD

(75) Inventor: David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 747 days.

(21) Appl. No.: 11/028,832

(22) Filed: Jan. 4, 2005

(65) Prior Publication Data

US 2006/0146952 A1 Jul. 6, 2006

(51) Int. Cl.
*H04B 7/02* (2006.01)
(52) U.S. Cl. .................. 375/267; 375/260; 375/347
(58) Field of Classification Search .................. 375/260, 375/267, 347, 269, 279, 362, 355, 308, 334, 375/141, 233–236; 708/5, 8, 21, 404
See application file for complete search history.

(56) References Cited

U.S. PATENT DOCUMENTS

| 2002/0027957 A1* | 3/2002 | Paulraj et al. ............... 375/267 |
| 2004/0131012 A1* | 7/2004 | Mody et al. ................. 370/210 |
| 2004/0233838 A1 | 11/2004 | Sudo et al. |
| 2005/0152314 A1* | 7/2005 | Sun et al. .................... 370/334 |
| 2005/0233709 A1* | 10/2005 | Gardner et al. ............. 455/101 |
| 2006/0133381 A1* | 6/2006 | Wang ......................... 370/394 |
| 2006/0251193 A1* | 11/2006 | Kopmeiners et al. ........ 375/345 |

FOREIGN PATENT DOCUMENTS

| EP | 1320232 A2 | 6/2003 |
| EP | 06100092.3 | 7/2006 |
| WO | 2005081481 A1 | 9/2005 |

OTHER PUBLICATIONS

Troya, Alfonso et al.; Simplified Residual Phase Correction Mechanism for the IEEE 802.11a Standard; 2003 IEEE; pp. 1137-1141.

* cited by examiner

*Primary Examiner*—David C Payne
*Assistant Examiner*—Rahel Guarino
(74) *Attorney, Agent, or Firm*—Steven A. Shaw; W. James Brady; Frederick J. Telecky, Jr.

(57) ABSTRACT

The present invention provides a post-channel estimate phase corrector for use with a multiple-input, multiple-output (MIMO) receiver employing M receive antennas, M being at least two. In one embodiment, the post-channel estimate phase corrector includes a pilot sequence coordinator configured to receive a pattern of pilot sequences from the M receive antennas during data symbol time periods. The post-channel estimate phase corrector also includes a phase calculator coupled to the pilot sequence coordinator and configured to calculate phase corrections for individual channel estimates based on the pattern of pilot sequences.

15 Claims, 3 Drawing Sheets

SCALABLE POST-CHANNEL ESTIMATE PHASE CORRECTOR, METHOD OF CORRECTION AND MIMO COMMUNICATION SYSTEM EMPLOYING THE CORRECTOR AND METHOD

TECHNICAL FIELD OF THE INVENTION

The present invention is directed, in general, to communication systems and, more specifically, to a scalable post-channel estimate phase corrector, a method of post-channel estimate phase correction and a multiple-input, multiple-output (MIMO) communication system employing the corrector and the method.

BACKGROUND OF THE INVENTION

Increasingly, the capacity and reliability of communication systems is a focus driving much of systems technology. Employing multiple-input, multiple-output (MIMO) communication systems is an area that supports this growth in the development of wireless networks. MIMO communication systems have been shown to provide improvements in both capacity and reliability over single-input, single-output (SISO) communication systems. These MIMO communication systems commonly employ a block structure wherein a MIMO transmitter (which is a cooperating collection of N single-dimension transmitters) sends a vector of symbol information. This symbol vector may represent one or more coded or uncoded SISO data symbols. A MIMO receiver (which is a cooperating collection of M single-dimension receivers, $M \geq N$) receives one or more copies of this transmitted vector of symbol information. The performance of the entire communication system hinges on the ability of the receiver to find reliable estimates of the symbol vector that was transmitted by the transmitter. This necessitates that the MIMO receiver provide reliable channel estimates associated with transmissions from the MIMO transmitter.

For example, a 2×2 MIMO communication system may transmit two independent and concurrent signals, employing two single-dimension transmit antennas and two single-dimension receive antennas. Alternatively, the antennas could be derived from a single physical antenna that appropriately employs polarization. Two receive signals $Y1(k)$, $Y2(k)$ on the $k^{th}$ sub-carrier/tone following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where $X1(k)$ and $X2(k)$ are two independent signals transmitted on the $k^{th}$ sub-carrier/tone from the first and second transmit antennas, respectively, and n1 and n2 are noises associated with the two receive signals. The term Hij(k), where i=1, 2 and j=1, 2, incorporates gain and phase distortion associated with symbols transmitted on the $k^{th}$ sub-carrier/tone from transmit antenna j to receive antenna i. The channel gain and phase terms Hij(k) may also include gain and phase distortions due to signal conditioning stages such as filters and other analog electronics. The receiver is required to estimate the channel values Hij(k) to reliably decode the transmitted signals $X1(k)$ and $X2(k)$.

To estimate the channel coefficients Hij(k) at the receiver, the transmitter and the receiver employ training sequences. These training sequences are predetermined and known at both the transmitter and the receiver. In an IEEE 802.11(a) compliant system, a training sequence (called a long sequence) is employed as part of a preamble to the transmission of data. This long sequence involves the transmission of a known sequence of vector symbols, employing 52 excited tones (1 or −1), an unexcited tone (0) at DC and unexcited tones at each end of the spectrum, to provide guard bands that are used to protect data tones from pass band filter effects.

Established channel estimates may be subject to depreciating influences during data transmission due to errors in sampling clocks and carrier frequencies associated with the transmitting and receiving systems. A common problem is a phase error associated with the data transmission, which degrades the integrity of the existing channel estimates and the resulting decoder performance of the receiver.

Accordingly, what is needed in the art is a way to improve established channel estimates for data transmissions associated with a MIMO communication system.

SUMMARY OF THE INVENTION

To address the above-discussed deficiencies of the prior art, the present invention provides a post-channel estimate phase corrector for use with a multiple-input, multiple-output (MIMO) receiver employing M receive antennas, M being at least two. In one embodiment, the post-channel estimate phase corrector includes a pilot sequence coordinator configured to receive a pattern of pilot sequences from the M receive antennas during data symbol time periods. The post-channel estimate phase corrector also includes a phase calculator coupled to the pilot sequence coordinator and configured to calculate phase corrections for individual channel estimates based on the pattern of pilot sequences.

In another aspect, the present invention provides a method of post-channel estimate phase correction for use with a multiple-input, multiple-output (MIMO) receiver employing M receive antennas, M being at least two. The method includes receiving a pattern of pilot sequences from the M receive antennas during data symbol time periods and calculating phase corrections for individual channel estimates based on the pattern of pilot sequences.

The present invention also provides, in yet another aspect, a multiple-input, multiple-output (MIMO) communication system. The MIMO communication system includes a MIMO transmitter that employs N transmit antennas, where N is at least two, to transmit a pattern of pilot sequences, and a MIMO receiver that employs M receive antennas, where M is at least two, to provide post-channel estimate phase corrections. The MIMO communication system also includes a post-channel estimate phase corrector that is coupled to the MIMO receiver, having a pilot sequence coordinator that receives the pattern of pilot sequences from the M receive antennas during data symbol time periods. The post-channel estimate phase corrector also has a phase calculator, coupled to the pilot sequence coordinator, that calculates phase corrections for individual channel estimates based on the pattern of pilot sequences thereby providing the post-channel estimate phase corrections.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention.

Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
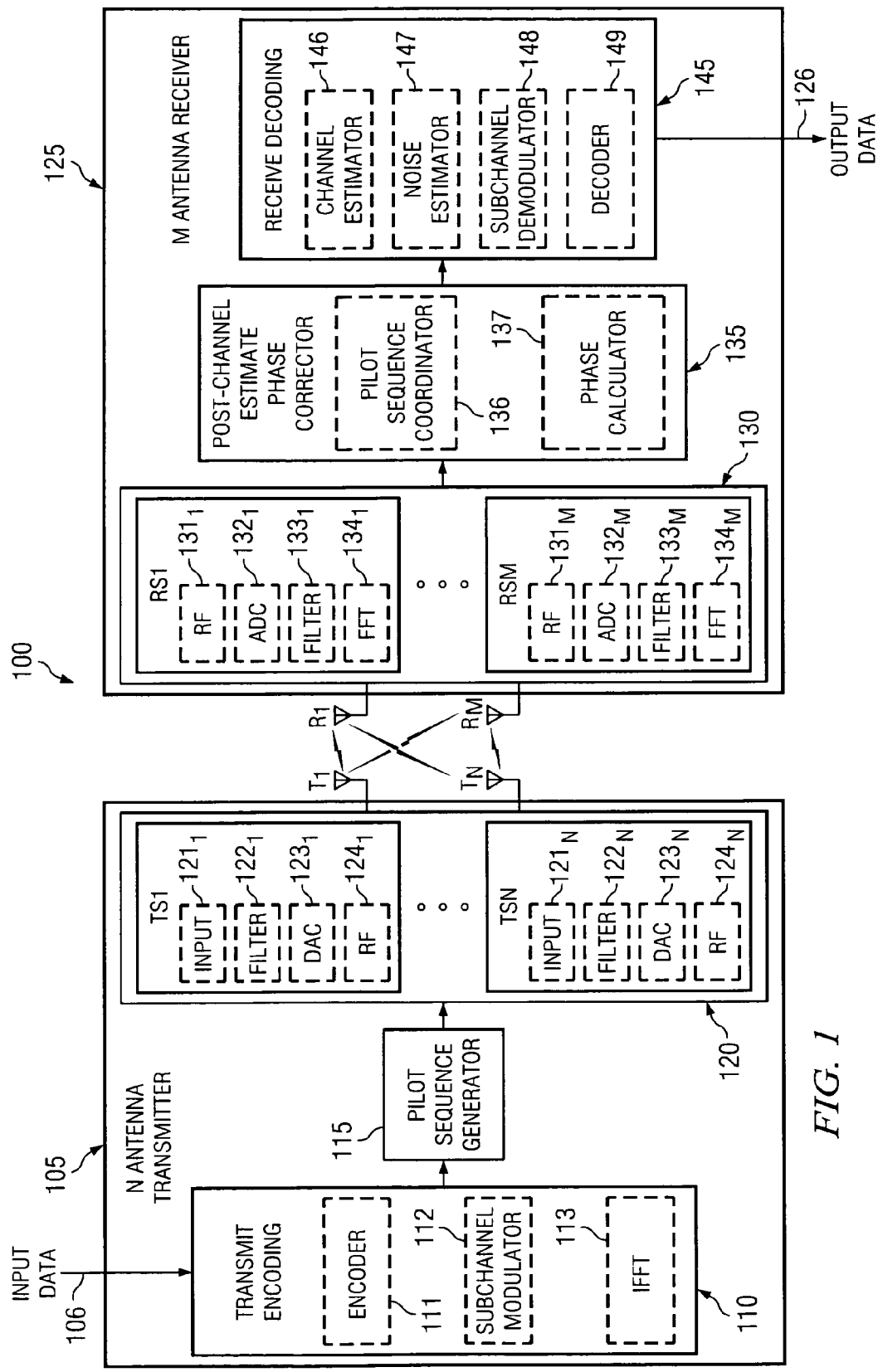
FIG. 1 illustrates a system diagram of an embodiment of an N×M MIMO communication system constructed in accordance with the principles of the present invention.

Referring initially to FIG. 1, illustrated is a system diagram of an embodiment of an N×M MIMO communication system, generally designated 100, constructed in accordance with the principles of the present invention. The MIMO communication system 100 includes a MIMO transmitter 105 that provides multiple concurrent data transmissions and a MIMO receiver 125. The MIMO transmitter 105 includes input data 106, a transmit encoding system 110, a pilot sequence generator 115, and a transmit system 120 having N transmit sections TS1-TSN coupled to N transmit antennas T1-TN, respectively. The MIMO receiver 125 includes a receive system 130 having M receive sections RS1-RSM respectively coupled to M receive antennas R1-RM, a post-channel estimate phase corrector 135 and a receive decoding system 145 providing output data 126. In the embodiment of FIG. 1, N and M are at least two.

The transmit encoding system 110 includes an encoder 111, a subchannel modulator 112 and an Inverse Fast Fourier Transform (IFFT) section 113. The encoder 111, subchannel modulator 112 and IFFT section 113 prepare the input data and support the arrangement of preamble and signal information for transmission by the transmit system 120. The pilot sequence generator 115 cooperates with the transmit encoding system 110 to generate a pilot sequence structure to be employed by the MIMO receiver 125 for post-channel estimate phase correction. The pilot sequence generator 115 may employ a pattern of pilot sequences that include time-switched pilot sequences, time-orthogonal pilot sequences, frequency-switched pilot sequences and frequency orthogonal pilot sequences.

The N transmit sections TS1-TSN include corresponding pluralities of N input sections $121_1$-$121_N$, N filters $122_1$-$122_N$, N digital-to-analog converters (DACs) $123_1$-$123_N$ and N radio frequency (RF) sections $124_1$-$124_N$, respectively. The N transmit sections TS1-TSN provide a time domain signal proportional to preamble information, signal information and input data for transmission by the N transmit antennas T1-TN, respectively.

The M receive antennas R1-RM receive the transmission and provide it to the M respective receive sections RS1-RSM, which include corresponding M RF sections $131_1$-$131_M$, M analog-to-digital converters (ADCs) $132_1$-$132_M$, M filters $133_1$-$133_M$, and M Fast Fourier Transform (FFT) sections $134_1$-$134_M$, respectively. The M receive sections RS1-RSM employ a proper AGC level to provide a frequency domain digital signal to the receive decoding system 145. This digital signal is proportional the preamble information, signal information and input data. Setting of the proper AGC level is accomplished by establishing a proper ratio between a desired power level and a received power level for a selected ADC backoff level.

The post-channel estimate phase corrector 135 includes a pilot sequence coordinator 136 and a phase calculator 137, which is coupled to the pilot sequence coordinator 136. The pilot sequence coordinator 136 receives the pattern of pilot sequences from the M receive antennas during data symbol time periods. The phase calculator 137 calculates phase corrections for individual channel estimates based on the pattern of pilot sequences thereby providing the post-channel estimate phase corrections.

The post-channel estimate phase corrector 135 employs a scalable property that allows it to accommodate a MIMO transmitter employing an N of two or more transmit antennas. Correspondingly, an associated MIMO receiver, having an M of two or more receive antennas, may also be accommodated to effectively provide an appropriate phase correction during data transmission.

In the illustrated embodiment, the pilot sequences employed are placed inside of the data symbols or packets. Additionally, each of the pilot sequences may employ as few as four real scalar pilot tones for N transmit antennas, where N is any number that is two or greater. Such a pilot sequence of four pilot tones may be represented as [1, 1, 1, −1], for example.

Figure 2:
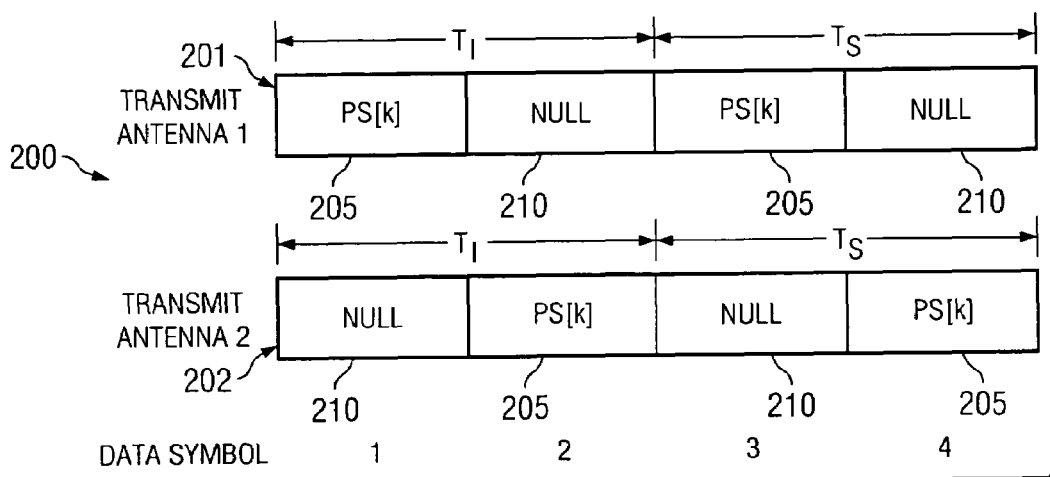
FIG. 2 illustrates an embodiment of a time-switched pilot sequence transmission frame format employable with a post-channel phase correction generator and constructed in accordance with the principles of the present invention.

Turning now to FIG. 2, illustrated is an embodiment of a time-switched pilot sequence transmission frame format for two transmit antennas, generally designated 200, employable with a post-channel estimate phase corrector and constructed in accordance with the principles of the present invention. The time-switched pilot sequence transmission frame format 200 is associated with an N×M MIMO communication system having an N of two transmit antennas and an M of at least two receive antennas.

Additionally, it demonstrates a pattern of pilot sequences wherein the pilot sequences and nulls are employed during each of initial and subsequent data symbol periods $T_I$, $T_S$. In the illustrated embodiment, the pattern of pilot sequences includes the pilot sequence PS[k], where k denotes the pilot tone indices, being spaced diagonally across the transmission frame employed during the initial data symbol period $T_I$ wherein other pilot sequence positions are occupied by the null. Then, this pattern is repeated during the subsequent data symbol period $T_S$. The number of pilot sequences and nulls required is a function of the N transmit antennas employed.

The null may be an un-modulated transmission or a transmission employing substantially zero modulation at the pilot tone indices. Alternatively, the null may be zero functions that are, by definition, zero almost everywhere, or they may be null sequences of numerical values that converge to zero.

Each of the nulls provide the same effect, which is that of an inconsequential value at the pilot tone index locations. Although the forms of the nulls employed may typically be the same, their forms may also advantageously differ while maintaining the inconsequential transmission effect stated above. Of course, the null format of each of the nulls may also be other current or future-developed formats, as advantageously required by a particular application.

In FIG. 2, the time-switched pilot sequence transmission frame format 200 includes first and second transmission frames 201, 202 that are associated with first and second transmit antennas. The initial data symbol period $T_I$ corresponds to data symbols 1 and 2, and the subsequent data symbol period $T_S$ corresponds to data symbols 3 and 4. In general the initial data symbol period $T_I$ corresponds to data symbols b and b+1, and the subsequent data symbol period $T_S$ corresponds to data symbols b+2 and b+3. As may be seen, a pilot sequence 205 denoted by PS[k] is employed in the first transmission frame 201 during the data symbol 1 and in the second transmission frame 202 during the data symbol 2 wherein a null 210 is employed elsewhere during each of these data symbols. This pattern is repeated during data symbols 3 and 4, as shown.

With reference to FIG. 1 for the illustrated embodiment of FIG. 2 and during the initial and subsequent data symbol periods $T_I$, $T_S$, the receive data at each receive antenna m for the pilot tone indices k may be expressed as:

$$Y_m[k,1] = H_{m1}[k,1]PS[k] + n_m[k,1] \quad (1a)$$

$$Y_m[k,2] = H_{m2}[k,2]PS[k] + n_m[k,2] \quad (1b)$$

$$Y_m[k,3] = H_{m1}[k,3]PS[k] + n_m[k,3] \quad (1c)$$

$$Y_m[k,4] = H_{m2}[k,4]PS[k] + n_m[k,4] \quad (1d)$$

where in general, $Y_m[k,b]$ is the received data at tone k (i.e., the subchannel) and symbol b (i.e., the symbol) and $n_m[k,b]$ is an associated noise term at the pilot tone indices. The MIMO data symbols contain either the pilot sequence 205 or the null sequence 210 at the pilot tone indices. In the illustrated embodiment, the pilot sequence 205 is a sequence of real scalars (e.g., [1,1,1,−1] and the pilot tone indices are [−21, −7,7, 21]), but such a restriction is not generally required. Equations (1a) through (1d) are only valid at the pilot tone indices (i.e., k∈{PilotToneIndices}).

The following development employs individual channel estimates $\hat{H}_{m1}[k,b]$ and $\hat{H}_{m2}[k,b]$ that are known before the data symbols begin (i.e., b=0). The process of determining the individual channel estimates may be accomplished employing an appropriately designed MIMO preamble. The initial conditions, and thus the starting symbol associated with phase correction, will be dictated by the MIMO preamble. A properly designed preamble will allow smooth phase tracking across the preamble/data symbol boundary. However, the following steps may be employed to seed this phase tracking, if necessary.

1. Phase correct $\hat{H}_{m1}[k,0]$ with respect to data symbol 1.
   (a) Compute $e^{j\phi_k}$ from $$e^{j\phi_k} = a\tan 2(\mathrm{imag}(Y_m[k,1]\hat{H}^*_{m1}[k,0]), \mathrm{real}(Y_m[k,1]\hat{H}^*_{m1}[k,0]))$$

at the pilot tone indices, k∈{PilotToneIndicies} where "*" denotes the complex conjugate and a tan 2 is the arctangent function of two variables.
   (b) Compute $\phi_k$ at the pilot tone indices, k∈{PilotToneIndices}.
   (c) Extrapolate the phase errors $\phi_k$ at the pilot tone indices to the data tone indices. Employing a linear curve fit is one straightforward way.
   (d) Compute $e^{j\phi_k}$ at the data tone indices, k∈{DataToneIndices}.
   (e) Evaluate $\hat{H}_{m1}[k,1] = e^{j\phi_k}\hat{H}_{m1}[k,0]$ at the data and pilot tone indices.

2. Phase correct $\hat{H}_{m1}[k,1]$ with respect to data symbol 2.
   (a) Use $e^{j\phi_k}$ from step 1 above as a phase error estimate.
   (b) Evaluate $\hat{H}_{m1}[k,2] = e^{j\phi_k}\hat{H}_{m1}[k,1]$ at the data and pilot tone indices.

3. Phase correct $\hat{H}_{m2}[k,0]$ with respect to data symbol 2.
   (a) Compute $e^{j\phi_k}$ from $$e^{j2\phi_k} = a\tan 2(\mathrm{imag}(Y_m[k,2]\hat{H}^*_{m2}[k,0]), \mathrm{real}(Y_m[k,2]\hat{H}^*_{m2}[k,0]))$$

at the pilot tone indices, k∈{PilotToneIndices}.
   (b) Compute $\phi_k$ at the pilot tone indices, k∈{PilotToneIndices}.
   (c) Extrapolate the phase errors $\phi_k$ at the pilot tone indices to the data tone indices. Employing a linear curve fit is one straightforward way.
   (d) Compute $e^{j\phi_k}$ at the data tone indices k∈{DataToneIndices}.
   (e) Evaluate $\hat{H}_{m2}[k,2] = e^{j2\phi_k}\hat{H}_{m2}[k,0]$ at the data and pilot tone indices.

For data symbols b that are greater than two, a general form of the phase correction and tracking algorithm for time-switched pilot sequences may be developed.

1. For even numbered symbols:
   (a) Phase correct $\hat{H}_{m1}[k,b-1]$ with respect to data symbol b.
      1. Use $e^{j\phi_k}$ from previous odd symbol as phase error estimate.
      2. Evaluate $\hat{H}_{m1}[k,b] = e^{j\phi_k}\hat{H}_{m1}[k,b-1]$ at the data and pilot tone indices.
   (b) Phase correct $\hat{H}_{m2}[k,b-1]$ with respect to data symbol b.
      1. Compute $e^{j\phi_k}$ from:

$$e^{j\phi_k} = a\tan 2(\mathrm{imag}(Y_m[k,b]\hat{H}^*_{m2}[k,b-1]), \mathrm{real}(Y_m[k,b]\hat{H}^*_{m2}[k,b-1]))$$

at the pilot tone indices, k∈{PilotToneIndices}.
      2. Compute $\phi_k$ at the pilot tone indices, k∈{PilotToneIndices}.
      3. Extrapolate the phase errors $\phi_k$ at the pilot tone indices to the data tone indices. Employing a linear curve fit is one straightforward way.
      4. Compute $e^{j\phi_k}$ at the data tone indices, k∈{DataToneIndices}.
      5. Evaluate $\hat{H}_{m2}[k,b] = e^{j\phi_k}\hat{H}_{m2}[k,b-1]$ at the data and pilot tone indices.

2. For odd numbered data symbols:
   (a) Phase correct $\hat{H}_{m1}[k,b-1]$ with respect to data symbol b.
      1. Compute $e^{j\phi_k}$ from $$e^{j\phi_k} = a\tan 2(\mathrm{imag}(Y_m[k,b]\hat{H}^*_{m1}[k,b-1]), \mathrm{real}(Y_m[k,b]\hat{H}^*_{m1}[k,b-1]))$$

at the pilot tone indices, k∈{PilotToneIndicies}.
      2. Compute $\phi_k$ at the pilot tone indices, k∈{PilotToneIndices}.
      3. Extrapolate the phase errors $\phi_k$ at the pilot tone indices to the data tone indices. Employing a linear curve fit is one straightforward way.
      4. Compute $e^{j\phi_k}$ at the data tone indices, k∈{DataToneIndices}.
      5. Evaluate $\hat{H}_{m1}[k,b] = e^{j\phi_k}\hat{H}_{m1}[k,b-1]$ at the data and pilot tone indices.

(b) Phase correct $\hat{H}_{m2}[k,b-1]$ to data symbol b.
  1. Use $e^{j\phi_k}$ from previous even symbol as phase error estimate.
  2. Evaluate $\hat{H}_{m2}[k,b]=e^{j\phi_k}\hat{H}_{m2}[k,b-1]$ at the data and pilot tone indices.

3. Repeat steps 1 and 2 above until the end of the packet is reached (i.e., symbol b equals the number of symbols per packet).

In this example, the pilot sequence is assumed to be a sequence of real scalars [1,1,1,−1] but the method is not restricted by this simplification. Also, without loss of generality, phase modulation (such as may be employed in the IEEE 802.11a standard) can be included in the above phase tracking algorithm. One skilled in the pertinent art can extend the time-switched pilot sequence analysis presented above to a general N×M MIMO communication system, where N and M are greater than two.

Figure 3:
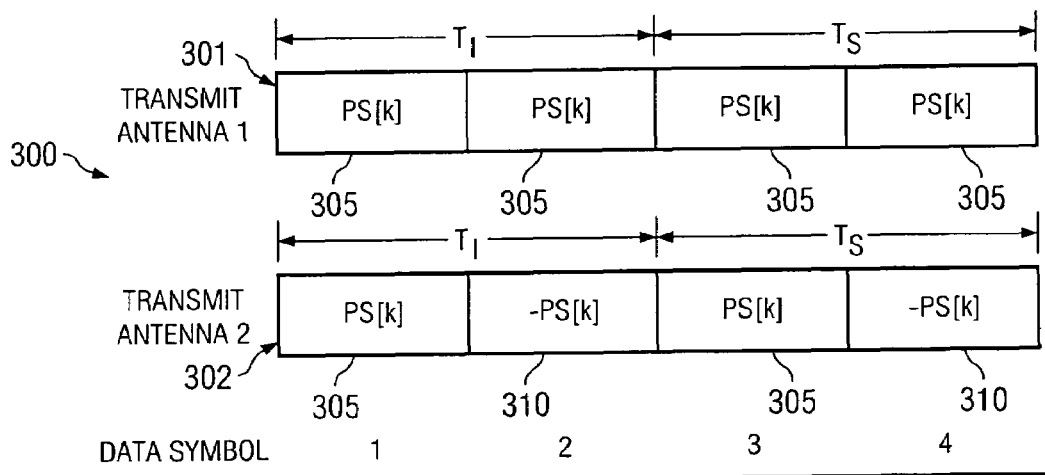
FIG. 3 illustrates an embodiment of a time-orthogonal pilot sequence transmission frame format employable with a post-channel phase correction generator and constructed in accordance with the principles of the present invention.

Turning now to FIG. 3, illustrated is an embodiment of a time-orthogonal pilot sequence transmission frame format for two transmit antennas, generally designated 300, employable with a post-channel estimate phase corrector and constructed in accordance with the principles of the present invention. The time-orthogonal transmission frame format 300 demonstrates a pattern of pilot sequences that includes a number of appropriately placed negations of the pilot sequence (i.e., pilot sequence negations) during each of initial and subsequent data symbol periods $T_I$, $T_S$. The number of pilot sequence negations required is a function of the N transmit antennas employed.

In FIG. 3, the time-orthogonal pilot sequence transmission frame format 300 includes first and second transmission frames 301, 302 that are associated with first and second transmit antennas. The initial data symbol period $T_I$ corresponds to data symbols 1 and 2, and the subsequent data symbol period $T_S$ corresponds to data symbols 3 and 4. In general, the initial data symbol period $T_I$ corresponds to data symbols b and b+1, and the subsequent data symbol period $T_S$ corresponds to data symbols b+2 and b+3. As may be seen, a pilot sequence 305 is employed in the first transmission frame 301 during the data symbols 1 and 2, and in the second transmission frame 302 during the data symbol 1. A pilot sequence negation 310 is employed during the data symbol 2 in the second transmission frame 302. This pattern is repeated during data symbols 3 and 4, as shown.

With reference to FIG. 1 for the illustrated embodiment of FIG. 3 and during the initial and subsequent data symbol periods $T_I$, $T_S$, the receive data at each receive antenna m for the pilot tone indices k may be expressed as:

$$Y_m[k,1]=(H_{m1}[k,1]+H_{m2}[k,1])PS[k]+n_m[k,1] \quad (2a)$$

$$Y_m[k,2]=(H_{m1}[k,2]-H_{m2}[k,2])PS[k]+n_m[k,2] \quad (2b)$$

$$Y_m[k,3]=(H_{m1}[k,3]+H_{m2}[k,3])PS[k]+n_m[k,3] \quad (2c)$$

$$Y_m[k,4]=(H_{m1}[k,4]-H_{m2}[k,4])PS[k]+n_m[k,4] \quad (2d)$$

where, as before, in general $Y_m[k,b]$ is the received data at tone k (i.e., the subchannel) and symbol b and $n_m[k,b]$ is an associated noise term. Equations (2a) through (2d) are only valid at the pilot tone indices (i.e., $k \in \{PilotToneIndices\}$).

Also as before, the following development employs individual channel estimates $\hat{H}_{m1}[k,b]$ and $\hat{H}_{m2}[k,b]$ that are known before the data symbols begin (i.e., b=0). The process of determining the individual channel estimates may be accomplished employing an appropriately designed MIMO preamble. The initial conditions, and thus the starting symbol associated with phase correction, will be dictated by the MIMO preamble. A properly designed preamble will allow smooth phase tracking across the preamble/data symbol boundary. However, the following steps may be employed to seed this phase tracking, if necessary.

1. Phase correct $Y_m[k,3]$ with respect to data symbol 4.
  (a) Compute $e^{j\phi_k}$ from:

$e^{j2\phi_k}=a\tan 2(\text{imag}(Y_m[k,3]Y^*_m[k,1]),\text{real}(Y_m[k,3]Y^*_m[k,1]))$ at the pilot tone indices, $k\in\{PilotToneIndices\}$.
  (b) Evaluate $Y'_m[k,3]=e^{j\phi_k}Y_m[k,3]$ at the pilot tone indices $k\in\{PilotToneIndices\}$.

2. Decouple the channel estimates.

(a) $\hat{H}_{m1}[k,4] = \dfrac{Y'_m[k,3]+Y_m[k,4]}{2PS[k]}$ for $k \in \{\text{Pilot Tone Indices}\}$.

(b) $\hat{H}_{m2}[k,4] = \dfrac{Y'_m[k,3]-Y_m[k,4]}{2PS[k]}$ for $k \in \{\text{Pilot Tone Indices}\}$.

3. Phase correct $\hat{H}_{m1}[k,0]$ to data symbol 4.
  (a) Compute $e^{j\phi_k}$ using:

$e^{j\phi_k}=a\tan 2(\text{imag}(\hat{H}_{m1}[k,4]\hat{H}^*_{m1}[k,0]),\text{real}(\hat{H}^*_{m1}[k,4]\hat{H}^*_{m1}[k,0]))$ at the pilot tone indices $k\in\{PilotToneIndices\}$
  (b) Compute $\phi_k$ at the pilot tone indices $k\in\{PilotToneIndices\}$.
  (c) Extrapolate the phase errors $\phi_k$ at the pilot tone indices to the data tone indices. Employing a linear curve fit is one straightforward way.
  (d) Compute $e^{j\phi_k}$ at the data tone indices $k\in\{DataToneIndices\}$.
  (e) Evaluate $\hat{H}_{m1}[k,4]=e^{j\phi_k}\hat{H}_{m1}[k,0]$ at the data tone and pilot tone indices.

4. Phase correct $\hat{H}_{m2}[k,0]$ to data symbol 4.
  a) Compute $e^{j\phi_k}$ using:

$e^{j\phi_k}=a\tan 2(\text{imag}(\hat{H}_{m2}[k,4]\hat{H}^*_{m2}[k,0]),\text{real}(\hat{H}^*_{m2}[k,4]\hat{H}^*_{m2}[k,0]))$ at the pilot tone indices, $k\in\{PilotToneIndicies\}$.
  (b) Compute $\phi_k$ at the pilot tone indices, $k\in\{PilotToneIndices\}$.
  (c) Extrapolate the phase errors $\phi_k$ at the pilot tone indices to the data tone indices employing a linear curve fit, for example.
  (d) Compute $e^{j\phi_k}$ at the data tone indices, $k\in\{DataToneIndicies\}$.
  (e) Evaluate $\hat{H}_{m2}[k,4]=e^{j\phi_k}\hat{H}_{m2}[k,0]$ at the data tone and pilot tone indices.

For data symbols b greater than 4, a general form of the phase correction and tracking algorithm for time-orthogonal pilot sequences may be developed.

1. Phase correct $Y_m[k,b-1]$ with respect to data symbol b.
  (a) Compute $e^{j\phi_k}$ using:

$e^{j2\phi_k}=a\tan 2(\text{imag}(Y_m[k,b-1]Y^*_m[k,b-3]),\text{real}(Y_m[k,b-1]Y^*_m[k,b-3]))$ at the pilot tone indices, $k\in\{PilotToneIndices\}$.
  (b) Evaluate $Y'_m[k,b-1]=e^{j\phi_k}Y_m[k,b-1]$ at the pilot tone indices, $k\in\{PilotToneIndices\}$.

2. Decouple channel estimates.
  (a) For even data symbols:

1. $\hat{H}_{m1}[k, b] = \dfrac{Y'_m[k, b-1] + Y_m[k, b]}{2PS[k]}$ for $k \in \{\text{Pilot Tone Indices}\}$.

2. $\hat{H}_{m2}[k, b] = \dfrac{Y'_m[k, b-1] - Y_m[k, b]}{2PS[k]}$ for $k \in \{\text{Pilot Tone Indices}\}$.

(b) For odd data symbols:

1. $\hat{H}_{m1}[k, b] = \dfrac{Y_m[k, b] + Y'_m[k, b-1]}{2PS[k]}$ for $k \in \{\text{Pilot Tone Indices}\}$.

2. $\hat{H}_{m2}[k, b] = \dfrac{Y_m[k, b] - Y'_m[k, b-1]}{2PS[k]}$ for $k \in \{\text{Pilot Tone Indices}\}$.

3. Phase correct $\hat{H}_{m1}[k,b-1]$ with respect to data symbol b.
    (a) Compute $e^{j\Phi_k}$ using $e^{j\Phi_k} = a\tan 2(\text{imag}(\hat{H}_{m1}[k,b]\hat{H}^*_{m1}[k,b-1]), \text{real}(\hat{H}_{m1}[k,b]\hat{H}^*_{m1}[k,b-1]))$ at the pilot tone indices, $k \in \{\text{PilotToneIndices}\}$.
    (b) Compute $\phi_k$ at the pilot tone indices, $k \in \{\text{PilotToneIndices}\}$.
    (c) Extrapolate the phase errors $\phi_k$ at the pilot tone indices to the data tone indices wherein a linear curve fit may be employed, as an example.
    (d) Compute $e^{j\Phi_k}$ at the data tones indices, $k \in \{\text{DataToneIndices}\}$.
    (e) Evaluate $\hat{H}_{m1}[k,b] = e^{j\Phi_k}\hat{H}_{m1}[k,b-1]$ at the data and pilot tone indices.

4. Phase correct $\hat{H}_{m2}[k,b-1]$ with respect to data symbol b.
    (a) Compute $e^{j\Phi_k}$ using:

$e^{j\Phi_k} = a\tan 2(\text{imag}(\hat{H}_{m2}[k,b]\hat{H}^*_{m2}[k,b-1]), \text{real}(\hat{H}_{m2}[k,b]\hat{H}^*_{m2}[k,b-1]))$ at the pilot tone indices, $k \in \{\text{PilotToneIndices}\}$.
    (b) Compute $\phi_k$ at the pilot tone indices, $k \in \{\text{PilotToneIndices}\}$.
    (c) Extrapolate the phase errors $\phi_k$ at the pilot tone indices to the data tone indices wherein a linear curve fit may be employed, as an example.
    (d) Compute $e^{j\Phi_k}$ at the data tone indices, $k \in \{\text{DataToneIndices}\}$.
    (e) Evaluate $\hat{H}_{m2}[k,b] = e^{j\Phi_k}\hat{H}_{m2}[k,b-1]$ at the data and pilot tone indices.

5. Repeat steps 1 through 4 above, until the end of the packet is reached (i.e., symbol b equals the number of symbols per packet).

In this example, the pilot sequence is assumed to be a sequence of real scalars [1,1,1,−1] but the method is not restricted by this simplification. Also, without loss of generality, phase modulation (such as may be employed in the IEEE 802.11a standard) can be included in the above phase tracking algorithm. One skilled in the pertinent art can extend the time-orthogonal pilot sequence analysis presented above to a general N×M MIMO communication system, where N and M are greater than two.

Figure 4:
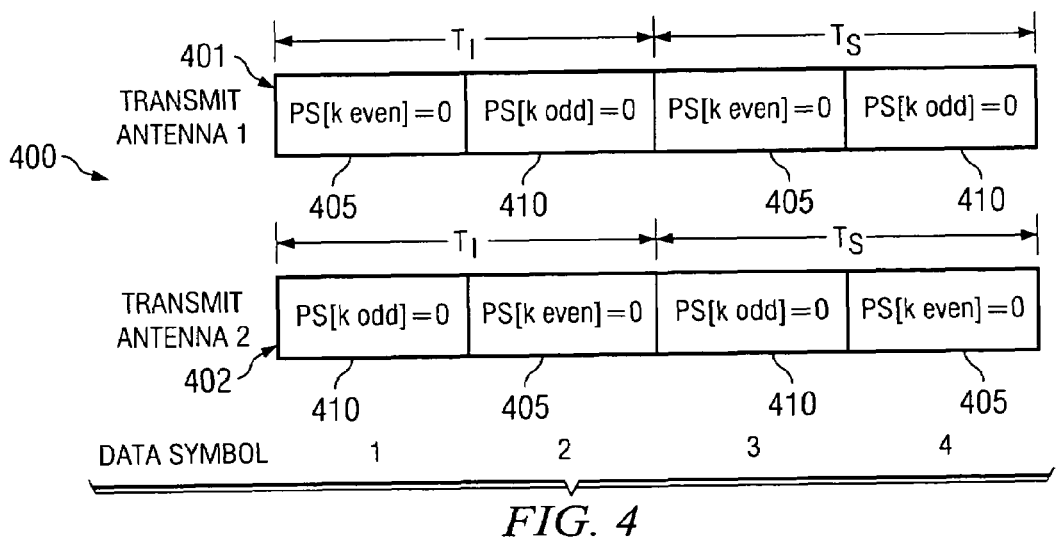
FIG. 4 illustrates an embodiment of a frequency-switched pilot sequence transmission frame format employable with a post-channel estimate phase corrector and constructed in accordance with the principles of the present invention.

Turning now to FIG. 4, illustrated is an embodiment of a frequency-switched pilot sequence transmission frame format for two transmit antennas, generally designated 400, employable with a post-channel estimate phase corrector and constructed in accordance with the principles of the present invention. The frequency-switched transmission frame format 400 is associated with an N×M MIMO communication system having an N of two transmit antennas and an M of at least two receive antennas. Additionally, it demonstrates a pattern of pilot sequences that are employed during each of the MIMO data symbols and in initial and subsequent data symbol periods $T_I$, $T_S$, as before. In the illustrated embodiment, the pattern of pilot sequences alternate with even and odd tones set to zero during consecutive data symbol time periods thereby forming a half-pattern that repeats, as shown.

In FIG. 4, the frequency-switched transmission frame format 400 includes first and second transmission frames 401, 402 that are associated with first and second transmit antennas. As may be seen, a pilot sequence 405 having even tones set to zero is employed in the first transmission frame 401 during the data symbol 1 and in the second transmission frame 402 during the data symbol 2. Correspondingly, a pilot sequence 410 having odd tones set to zero is employed in the first transmission frame 401 during the data symbol 2 and in the second transmission frame 402 during the data symbol 1. This pattern is repeated during data symbols 3 and 4, as shown.

With reference to FIG. 1 for the illustrated embodiment of FIG. 4 and during initial and subsequent data symbol periods $T_I$, $T_S$, the receive data at each receive antenna m for the pilot tone indices k may be written as:

$$Y_m[k, 1] = \begin{cases} H_{m1}[k, 1]PS[k] + n_m[k, 1] & \text{for } k \in \{\text{odd pilot tone indices}\} \\ H_{m2}[k, 1]PS[k] + n_m[k, 1] & \text{for } k \in \{\text{even pilot tone indices}\} \end{cases} \quad (3a)$$

$$Y_m[k, 2] = \begin{cases} H_{m1}[k, 2]PS[k] + n_m[k, 2] & \text{for } k \in \{\text{even pilot tone indices}\} \\ H_{m2}[k, 2]PS[k] + n_m[k, 2] & \text{for } k \in \{\text{odd pilot tone indices}\} \end{cases} \quad (3b)$$

$$Y_m[k, 3] = \begin{cases} H_{m1}[k, 3]PS[k] + n_m[k, 3] & \text{for } k \in \{\text{odd pilot tone indices}\} \\ H_{m2}[k, 3]PS[k] + n_m[k, 3] & \text{for } k \in \{\text{even pilot tone indices}\} \end{cases} \quad (3c)$$

$$Y_m[k, 4] = \begin{cases} H_{m1}[k, 4]PS[k] + n_m[k, 4] & \text{for } k \in \{\text{even pilot tone indices}\} \\ H_{m2}[k, 4]PS[k] + n_m[k, 4] & \text{for } k \in \{\text{odd pilot tone indices}\} \end{cases} \quad (3d)$$

where in general $Y_m[k,b]$ is the received data at tone k (i.e. the subchannel) and data symbol b (i.e., the symbol). The following algorithm assumes that the individual channel estimates, $\hat{H}_{m1}[k,b]$ and $\hat{H}_{m2}[k,b]$ are known before the data symbols begin (i.e., b=0). The process of determining the individual channel estimates is usually accomplished with an appropriately designed MIMO preamble. The initial conditions, and thus the starting symbol, of the phase tracking algorithm will be dictated by the MIMO preamble. A properly designed preamble will allow smooth phase tracking across the preamble/data symbol boundary.

The general form of the phase estimation and tracking algorithm for frequency-switched pilot sequences is:

1. For even data symbols:
   (a) Phase correct $\hat{H}_{m1}[k,b-1]$ with respect to data symbol b.
      1. Compute $e^{j\phi_k}$ from $e^{j\phi_k}=a\tan 2(\text{imag}(Y_m[k,b]\hat{H}^*_{m1}[k,b-1]),\text{real}(Y_m[k,b]\hat{H}^*_{m1}[k,b-1]))$ at the even pilot tone indices k∈{Even Pilot Tone Indices}.
      2. Compute $\phi_k$ at the even pilot tone indices, k∈{Even Pilot Tone Indices}.
      3. Extrapolate the phase errors $\phi_k$ at the pilot tone indices to the data tone indices. Linear curve fitting is a straightforward way.
      4. Compute $e^{j\phi_k}$ at the data tone indices, k∈{Data Tone Indices}.
      5. Evaluate $\hat{H}_{m1}[k,b]=e^{j\phi_k}\hat{H}_{m1}[k,b-1]$ at the data and pilot tone indices.
   (b) Phase correct $\hat{H}_{m2}[k,b-1]$ with respect to data symbol b.
      1. Compute $e^{j\phi_k}$ from $e^{j\phi_k}=a\tan 2(\text{imag}(Y_m[k,b]\hat{H}^*_{m2}[k,b-1]),\text{real}(Y_m[k,b]\hat{H}^*_{m2}[k,b-1]))$ at the odd pilot tone indices, k∈{Odd Pilot Tone Indices}.
      2. Compute $\phi_k$ at the odd pilot tone indices, k∈{Odd Pilot Tone Indices}.
      3. Extrapolate the phase errors, $\phi_k$ at the pilot tone indices to the data tone indices. Linear curve fitting is a straightforward way.
      4. Compute $e^{j\phi_k}$ at the data tone indices, k∈{Data Tone Indices}.
      5. Evaluate $\hat{H}_{m2}[k,b]=e^{j\phi_k}\hat{H}_{m2}[k,b-1]$ at the data and pilot tone indices.

2. For odd data symbols:
   (a) Phase correct $\hat{H}_{m2}[k,b-1]$ with respect to data symbol b.
      1. Compute $e^{j\phi_k}$ from $e^{j\phi_k}=a\tan 2(\text{imag}(Y_m[k,b]\hat{H}^*_{m2}[k,b-1]),\text{real}(Y_m[k,b]\hat{H}^*_{m2}[k,b-1]))$ at the odd pilot tone indices, k∈{Odd Pilot Tone Indices}.
      2. Compute $\phi_k$ at the odd pilot tone indices, k∈{odd Pilot Tone Indices}.
      3. Extrapolate the phase errors $\phi_k$ at the pilot indices to the data tone indices. Linear curve fitting is a straightforward way.
      4. Compute $e^{j\phi_k}$ at the data tone indices k∈{Data Tone Indices}.
      5. Evaluate $\hat{H}_{m1}[k,b]=e^{j\phi_k}\hat{H}_{m1}[k,b-1]$ at the data and pilot tone indices.
   (b) Phase correct $\hat{H}_{m2}[k,b-1]$ with respect to data symbol b.
      1. Compute $e^{j\phi_k}$ from $e^{j\phi_k}=a\tan 2(\text{imag}(Y_m[k,b]\hat{H}^*_{m2}[k,b-1]),\text{real}(Y_m[k,b]\hat{H}^*_{m2}[k,b-1]))$ at the even pilot tone indices, k∈{Even Pilot Tone Indices}.
      2. Compute $\phi_k$ at the even pilot tone indices, k∈{Even Pilot Tone Indices}.
      3. Extrapolate the phase errors $\phi_k$ at the pilot tone indices to the data tone indices. Linear curve fitting is a straightforward way.
      4. Compute $e^{j\phi_k}$ at the data time indices k∈{Data Tone Indices}.
      5. Evaluate $\hat{H}_{m2}[k,b]=e^{j\phi_k}\hat{H}_{m2}[k,b-1]$ at the data and pilot tone indices.

3. Repeat steps 1 and 2 until the end of the packet is reached (i.e., symbol count b equals the number of symbols per packet).

In this example, the pilot sequence is assumed to be a sequence of real scalars [1,1,1,−1] but the method is not restricted by this simplification. Also, without loss of generality, phase modulation (such as may be employed in the IEEE 802.11a standard) can be included in the above phase tracking algorithm. One skilled in the pertinent art can extend the frequency-switched pilot sequence analysis presented above to a general N×M MIMO communication system, where N and M are greater than two.

Figure 5:
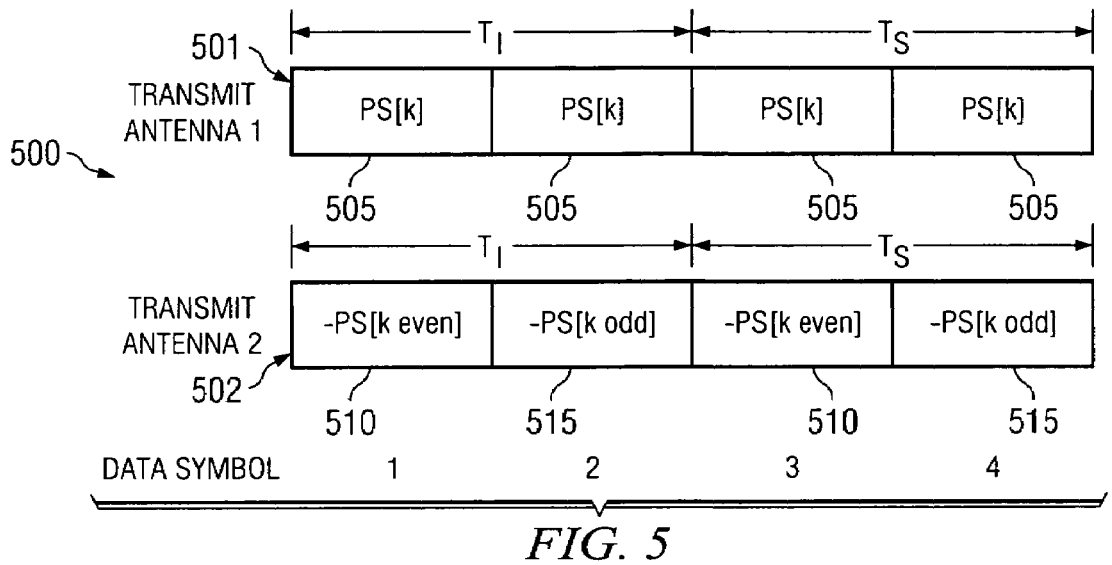
FIG. 5 illustrates an embodiment of a frequency-orthogonal pilot sequence transmission frame format employable with a post-channel estimate phase corrector and constructed in accordance with the principles of the present invention.

Turning now to FIG. 5, illustrated is an embodiment of a frequency-orthogonal pilot sequence transmission frame format for two transmit antennas, generally designated 500, employable with a post-channel estimate phase corrector and constructed in accordance with the principles of the present invention. The frequency-orthogonal transmission frame format 500 is associated with an N×M MIMO communication system having an N of two transmit antennas and an M of at least two receive antennas. It demonstrates a pattern of pilot sequences that are employed during each of the MIMO data symbols and during initial and subsequent data symbol periods $T_I$, $T_S$, as before.

In FIG. 5, the frequency-orthogonal transmission frame format 500 includes first and second transmission frames 501, 502 that are associated with first and second transmit antennas. As may be seen, a first pilot sequence 505 is consistently employed in the first transmission frame 501 during data symbols 1-4. Correspondingly, a second pilot sequence 510 alternates data symbol time periods with a third pilot sequence 515 in the second transmission frame 502, as shown. The second pilot sequence 510 is a negation of the first pilot sequence 505 at the even tones. Similarly, the third pilot sequence 515 is a negation of the first pilot sequence 505 at the odd tones.

With reference to FIG. 1 for the illustrated embodiment of FIG. 5 and during initial and subsequent data symbol periods $T_I$, $T_S$, the receive data at each receive antenna m for the pilot tone indices k can be written as:

$$Y_m[k,1] = \begin{cases} (H_{m1}[k,1]-H_{m2}[k,1])PS[k]+n_m[k,1] & \text{for } k \in \{\text{even pilot tone indices}\} \\ (H_{m1}[k,1]+H_{m2}[k,1])PS[k]+n_m[k,1] & \text{for } k \in \{\text{odd pilot tone indices}\} \end{cases} \quad (4a)$$

$$Y_m[k,2] = \begin{cases} (H_{m1}[k,2]-H_{m2}[k,2])PS[k]+n_m[k,2] & \text{for } k \in \{\text{odd pilot tone indices}\} \\ (H_{m1}[k,2]+H_{m2}[k,2])PS[k]+n_m[k,2] & \text{for } k \in \{\text{even pilot tone indices}\} \end{cases} \quad (4b)$$

-continued $$Y_m[k,3] = \begin{cases} (H_{m1}[k,3] - H_{m2}[k,3])PS[k] + n_m[k,3] & \text{for } k \in \{\text{even pilot tone indices}\} \\ (H_{m1}[k,3] + H_{m2}[k,3])PS[k] + n_m[k,3] & \text{for } k \in \{\text{odd pilot tone indices}\} \end{cases} \quad (4c)$$

$$Y_m[k,4] = \begin{cases} (H_{m1}[k,4] - H_{m2}[k,4])PS[k] + n_m[k,4] & \text{for } k \in \{\text{odd pilot tone indices}\} \\ (H_{m1}[k,4] + H_{m2}[k,4])PS[k] + n_m[k,4] & \text{for } k \in \{\text{even pilot tone indices}\} \end{cases} \quad (4d)$$

where in general $Y_m[k,b]$ is the received data at tone k (i.e., the subchannel) and data symbol b (i.e., the symbol).

The following algorithm assumes that the individual channel estimates $\hat{H}_{m1}[k,b]$ and $\hat{H}_{m2}[k,b]$ are known before the data symbols begin (i.e., b=0). The process of determining the individual channel estimates is usually accomplished with an appropriately designed MIMO preamble. The initial conditions, and thus the starting symbol, of the phase tracking algorithm will be dictated by the MIMO preamble. A properly designed preamble will allow smooth tracking across the preamble/data symbol boundary. However, the following four steps can be used to seed the phase tracking algorithm if necessary.

1. Phase correct $Y_m[k,3]$ with respect to data symbol 4.
   (a) Compute $e^{j\phi_k}$ from $e^{j\phi_k} = a\tan2(\text{imag}(Y_m[k,3]Y^*_m[k,1]),\text{real}(Y_m[k,3]Y^*_m[k,1]))$ at the pilot indices $k \in \{\text{Pilot Tone Indices}\}$.
   (b) Evaluate $Y'_m[k,3] = e^{j\phi_k}Y_m[k,3]$ at the pilot indices $k \in \{\text{Pilot Tone Indices}\}$.

2. Decouple channel estimates at data symbol 4.

(a) $\hat{H}_{m1}[k,4] = \dfrac{Y_m[k,4] + Y'_m[k,3]}{2PS[k]}$ for $k \in \{\text{Pilot Tone Indices}\}$.

(b) $\hat{H}_{m2}[k,4] = \dfrac{Y_m[k,4] + Y'_m[k,3]}{2PS[k]}$ for $k \in \{\text{Pilot Tone Indices}\}$.

3. Phase correct $\hat{H}_{m1}[k,0]$ with respect to data symbol 4.
   (a) Compute $e^{j\phi_k}$ using $e^{j\phi_k} = a\tan2(\text{imag}(\hat{H}_{m1}[k,4]\hat{H}^*_{m1}[k,0]),\text{real}(\hat{H}_{m1}[k,4]\hat{H}^*_{m1}[k,0]))$ at the pilot tone indices, $k \in \{\text{Pilot Tone Indices}\}$.
   (b) Compute $\phi_k$ at the pilot tone indices $k \in \{\text{Pilot Tone Indices}\}$.
   (c) Extrapolate the phase errors $\phi_k$ at the pilot tone indices to the data tone indices. Linear curve fitting is a straightforward way.
   (d) Compute $e^{j\phi_k}$ at the data tone indices $k \in \{\text{Data Tone Indices}\}$.
   (e) Evaluate $\hat{H}_{m1}[k,4] = e^{j\phi_k}\hat{H}_{m1}[k,0]$ at the data and pilot tone indices.

4. Phase correct $\hat{H}_{m2}[k,0]$ with respect to data symbol 4.
   (a) Compute $e^{j\phi_k}$ using $e^{j\phi_k} = a\tan2(\text{imag}(\hat{H}_{m2}[k,4]\hat{H}^*_{m2}[k,0]),\text{real}(\hat{H}_{m2}[k,4]\hat{H}^*_{m2}[k,0]))$ at the pilot tone indices $k \in \{\text{PilotToneIndices}\}$.
   (b) Compute $\phi_k$ at the pilot tone indices $k \in \{\text{PilotToneIndices}\}$.
   (c) Extrapolate the phase errors $\phi_k$ at the pilot tone indices to the data tone indices. Linear curve fitting is a straightforward way.
   (d) Compute $e^{j\phi_k}$ at the data tone indices $k \in \{\text{Data Tone Indices}\}$.
   (e) Evaluate $\hat{H}_{m2}[k,4] = e^{j\phi_k}\hat{H}_{m2}[k,0]$ at the data and pilot tone indices.

For data symbols b greater that 4, the general form of the phase estimation and tracking algorithm for frequency-orthogonal pilot sequences may be expressed as follows.

1. Phase correct $Y_m[k,b-1]$ with respect to data symbol b.
   (a) Compute $e^{j\phi_k}$ using $e^{j\phi_k} = a\tan2(\text{imag}(Y_m[k,b-1]Y^*_m[k,b-3]),\text{real}(Y_m[k,b-1]Y^*_m[k,b-3]))$ at the pilot tone indices $k \in \{\text{Pilot Tone Indices}\}$.
   (b) Evaluate $Y'_m[k,b-1] = e^{j\phi_k}Y_m[k,b-1]$ at the pilot tone indices $k \in \{\text{Pilot Tone Indices}\}$.

2. Decouple channel estimates.
   (a) For even data symbols:

1. $\hat{H}_{m1}[k,b] = \dfrac{Y_m[k,b] + Y'_m[k,b-1]}{2PS[k]}$ for $k \in \{\text{Pilot Tone Indices}\}$, 2. $\hat{H}_{m2}[k,b] = \dfrac{Y_m[k,b] - Y'_m[k,b-1]}{2PS[k]}$ for $k \in \{\text{Pilot Tone Indices}\}$.

(b) For odd data symbols:

1. $\hat{H}_{m1}[k,b] = \dfrac{Y_m[k,b] + Y'_m[k,b-1]}{2PS[k]}$ for $k \in \{\text{Pilot Tone Indices}\}$, 2. $\hat{H}_{m2}[k,b] = \dfrac{Y_m[k,b] - Y'_m[k,b-1]}{2PS[k]}$ for $k \in \{\text{Pilot Tone Indices}\}$.

3. Phase correct $\hat{H}_{m1}[k,b-1]$ with respect to data symbol b.
   (a) Compute $e^{j\phi_k}$ using $e^{j\phi_k} = a\tan2(\text{imag}(\hat{H}_{m1}[k,b]\hat{H}^*_{m1}[k,b-1]),\text{real}(\hat{H}_{m1}[k,b]\hat{H}^*_{m1}[k,b-1]))$ at the pilot tone indices $k \in \{\text{Pilot Tone Indices}\}$.
   (b) Compute $\phi_k$ at the pilot tone indices $k \in \{\text{Pilot Tone Indices}\}$.
   (c) Extrapolate the phase errors $\phi_k$ at the pilot tone indices to the data tone indices. Linear curve fitting is a straightforward way.
   (d) Compute $e^{j\phi_k}$ at the data tone indices $k \in \{\text{Data Tone Indices}\}$.
   (e) Evaluate $\hat{H}_{m1}[k,b] = e^{j\phi_k}\hat{H}_{m1}[k,b-1]$ at the data and pilot tone indices.

4. Phase correct $\hat{H}_{m2}[k,b-1]$ with respect to data symbol b.
   (a) Compute $e^{j\phi_k}$ using $e^{j\phi_k} = a\tan2(\text{imag}(\hat{H}_{m2}[k,b]\hat{H}^*_{m2}[k,b-1]),\text{real}(\hat{H}_{m2}[k,b]\hat{H}^*_{m2}[k,b-1]))$ at the pilot tone indices $k \in \{\text{Pilot Tone Indices}\}$.
   (b) Compute $\phi_k$ at the pilot tone indices $k \in \{\text{Pilot Tone Indices}\}$.

(c) Extrapolate the phase errors $\phi_k$ at the pilot tone indices to the data tone indices. Linear curve fitting is a straightforward way.

(d) Compute $e^{j\Phi_k}$ at the data tone indices k∈{Data Tone Indices}.

(e) Evaluate $\hat{H}_{m2}[k,b]=e^{j\Phi_k}\hat{H}_{m2}[k,b-1]$ at the data and pilot tone indices.

5. Repeat steps 1-4 until the end of packet is reached (i.e., symbol count b equals the number of symbols per packet).

In this example, the pilot sequence is assumed to be a sequence of real scalars [1,1,1,−1] but the method is not restricted by this simplification. Also, without loss of generality, phase modulation (such as may be employed in the IEEE 802.11a standard) can be included in the above phase tracking algorithm. One skilled in the pertinent art can extend the frequency-orthogonal pilot sequence analysis presented above to a general N×M MIMO communication system, where N and M are greater than two.

Figure 6:
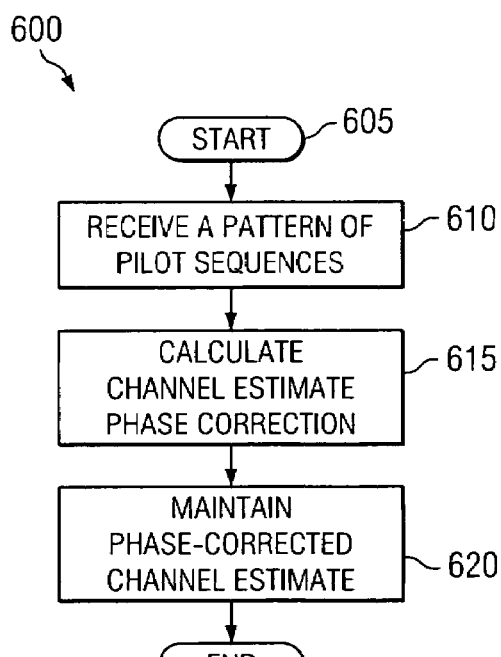
FIG. 6 illustrates a flow diagram of an embodiment of a method of post-channel estimate phase correction carried out in accordance with the principles of the present invention.

Turning now to FIG. 6, illustrated is a flow diagram of an embodiment of a method of post-channel estimate phase correction, generally designated 600, carried out in accordance with the principles of the present invention. The method 600 starts in a step 605 employing a MIMO receiver having M receive antennas where M is at least two. In a step 610, individual channel estimates are employed to receive a pattern of pilot sequences from the M receive antennas during data symbol time periods.

The pattern of pilot sequences is selected from the group consisting of time-switched pilot sequences, time-orthogonal pilot sequences, frequency-switched pilot sequences and frequency-orthogonal pilot sequences. Additionally, the pattern of pilot sequences is based on N transmit antennas, where the number N is at least two, and the pattern of pilot sequences employs a half-pattern during an initial data symbol period that repeats during a subsequent data symbol period.

The number of the data symbol time periods employed in the pattern of pilot sequences is also based on the number of N transmit antennas, and the initial and subsequent data symbol periods are typically contiguous although they may be separated as appropriate to a particular application. At least one channel estimate phase correction, based on the pattern of pilot sequences, is calculated in a step 615, and a phase-corrected channel estimate is maintained thereby allowing tracking between data symbols in a step 620. The method ends in a step 625.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a post-channel estimate phase corrector, a method of post-channel estimate phase correction and an N×M MIMO communication system employing the corrector or method have been presented. Advantages include the provision of a robust phase estimation employing pilot sequences that are either time-switched, time-orthogonal, frequency-switched or frequency-orthogonal wherein an exemplary form of each has been presented. The exemplary forms presented may use as few as only four pilot tones regardless of the number of transmit antennas, and one skilled in the art may employ other exemplary forms and other pilot tone requirements without departing from the spirit of the invention. Independent phase tracking for each channel estimate is also provided. Additionally, phase modulation corresponding to that associated with employing a standard, such as IEEE 802.11a for example, may also be accommodated.

Although the present invention has been described in detail, those skilled in the art should understand that they can make various changes, substitutions and alterations herein without departing from the spirit and scope of the invention in its broadest form.

What is claimed is:

1. A post-channel estimate phase corrector for use with a multiple-input, multiple-output (MIMO) receiver employing M receive antennas, M being at least two, comprising:
   a pilot sequence coordinator configured to receive a pattern of pilot sequences from said M receive antennas during data symbol time periods wherein said pattern of pilot sequences is selected from a group consisting of time-orthogonal pilot sequences and frequency-orthogonal pilot sequences and wherein said pattern of pilot sequences employs a half-pattern during an initial data symbol period that repeats during a subsequent data symbol period; and
   a phase calculator coupled to said pilot sequence coordinator and configured to calculate phase corrections for individual channel estimates based on said pattern of pilot sequences.

2. The corrector as recited in claim 1 wherein said pattern of pilot sequences is based on N transmit antennas, where N is at least two.

3. The corrector as recited in claim 1 wherein each pilot sequence in said pattern of pilot sequences employs four real scalar pilot tones.

4. The corrector as recited in claim 1 wherein a number of said data symbol time periods employed in said pattern of pilot sequences is based on N transmit antennas, where N is at least two.

5. The corrector as recited in claim 1 wherein said data symbol time periods are contiguous.

6. A method of post-channel estimate phase correction for use with a multiple-input, multiple-output (MIMO) receiver employing M receive antennas, M being at least two, comprising:
   receiving a pattern of pilot sequences from said M receive antennas during data symbol time periods wherein said pattern of pilot sequences is selected from a group consisting of time-orthogonal pilot sequences and frequency-orthogonal pilot sequences and wherein said pattern of pilot sequences employs a half-pattern during an initial data symbol period that repeats during a subsequent data symbol period; and
   calculating phase corrections for individual channel estimates based on said pattern of pilot sequences.

7. The method as recited in claim 6 wherein said pattern of pilot sequences is based on N transmit antennas, where N is at least two.

8. The method as recited in claim 6 wherein each pilot sequence in said pattern of pilot sequences employs four real scalar pilot tones.

9. The method as recited in claim 6 wherein a number of said data symbol time periods employed in said pattern of pilot sequences is based on N transmit antennas, where N is at least two.

10. The method as recited in claim 6 wherein said data symbol time periods are contiguous.

11. A multiple-input, multiple-output (MIMO) communication system, comprising:

a MIMO transmitter that employs N transmit antennas, N being at least two, to transmit a pattern of pilot sequences;

a MIMO receiver that employs M receive antennas, M being at least two, and provides post-channel estimate phase corrections; and a post-channel estimate phase corrector that is coupled to said MIMO receiver, including:

a pilot sequence coordinator that receives said pattern of pilot sequences from said M receive antennas during data symbol time periods wherein said pattern of pilot sequences is selected from a group consisting of time-orthogonal pilot sequences and frequency-orthogonal pilot sequences and wherein said pattern of pilot sequences employs a half-pattern during an initial data symbol period that repeats during a subsequent data symbol period, and a phase calculator, coupled to said pilot sequence coordinator, that calculates phase corrections for individual channel estimates based on said pattern of pilot sequences thereby providing said post-channel estimate phase corrections.

12. The communication system as recited in claim 11 wherein said pattern of pilot sequences is based on N transmit antennas, where N is at least two.

13. The communication system as recited in claim 11 wherein each pilot sequence in said pattern of pilot sequences employs four real scalar pilot tones.

14. The communication system as recited in claim 11 wherein a number of said data symbol time periods employed in said pattern of pilot sequences is based on N transmit antennas, where N is at least two.

15. The communication system as recited in claim 11 wherein said data symbol time periods are contiguous.

* * * * *

UNITED STATES PATENT AND TRADEMARK OFFICE
CERTIFICATE OF CORRECTION

PATENT NO. : 7,668,251 B2 Page 1 of 1
APPLICATION NO. : 11/028832
DATED : February 23, 2010
INVENTOR(S) : David P. Magee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Twenty-eighth Day of December, 2010

David J. Kappos
*Director of the United States Patent and Trademark Office*